(12) United States Patent
Jurczyk

(10) Patent No.: US 9,970,555 B2
(45) Date of Patent: May 15, 2018

(54) GATE VALVE

(71) Applicant: LB Bentley Limited, Stroud, Gloucestershire (GB)

(72) Inventor: Krzysztof Jurczyk, Stroud (GB)

(73) Assignee: LB Bentley Limited, Stroud, Gloucestershire (GB)

( * ) Notice: Subject to any disclaimer, the term of this patent is extended or adjusted under 35 U.S.C. 154(b) by 84 days.

(21) Appl. No.: 14/903,847

(22) PCT Filed: Jul. 8, 2014

(86) PCT No.: PCT/GB2014/052072
§ 371 (c)(1),
(2) Date: Jan. 8, 2016

(87) PCT Pub. No.: WO2015/004438
PCT Pub. Date: Jan. 15, 2015

(65) Prior Publication Data
US 2016/0161007 A1    Jun. 9, 2016

(30) Foreign Application Priority Data

Jul. 10, 2013 (GB) .................................. 1312348.4
May 15, 2014 (GB) .................................. 1408647.4
May 23, 2014 (GB) .................................. 1409240.7

(51) Int. Cl.
*F16K 3/08* (2006.01)
*F16K 3/10* (2006.01)
(Continued)

(52) U.S. Cl.
CPC .................. *F16K 3/08* (2013.01); *F16K 3/10* (2013.01); *F16K 1/18* (2013.01); *F16K 1/20* (2013.01);
(Continued)

(58) Field of Classification Search
CPC ..... F16K 3/10; F16K 3/08; F16K 1/18; F16K 1/20; F16K 1/228; F16K 27/047; F16K 27/065
(Continued)

(56) References Cited

U.S. PATENT DOCUMENTS 1,953,448 A    3/1934    Thaete et al.
2,351,732 A    6/1944    Almond et al.
(Continued)

FOREIGN PATENT DOCUMENTS

EP    0215132    3/1987
FR    2518697    6/1983
(Continued)

OTHER PUBLICATIONS

International Search Report for PCT/GB2014/052072 dated Oct. 17, 2014.

*Primary Examiner* — Matthew W Jellett
*Assistant Examiner* — Christopher Ballman
(74) *Attorney, Agent, or Firm* — Andrus Intellectual Property Law, LLP

(57) ABSTRACT

A valve gate button is disclosed comprising a contacting face for sealing a port of a valve seat, wherein the contacting face is flat and has a substantially straight flow control edge. A valve gate is disclosed, comprising the valve gate button. A valve is disclosed comprising the valve gate button or valve gate.

20 Claims, 6 Drawing Sheets

(51) Int. Cl.
*F16K 1/18* (2006.01)
*F16K 27/06* (2006.01)
*F16K 1/228* (2006.01)
*F16K 27/04* (2006.01)
*F16K 1/20* (2006.01)

(52) U.S. Cl.
CPC ............ *F16K 1/228* (2013.01); *F16K 27/047* (2013.01); *F16K 27/065* (2013.01)

(58) Field of Classification Search
USPC .................................................. 251/160, 207
See application file for complete search history.

(56) References Cited

U.S. PATENT DOCUMENTS

| | | | | |
|---|---|---|---|---|
| 2,914,293 | A * | 11/1959 | Harrell | F16K 21/12 251/335.1 |
| 3,572,385 | A * | 3/1971 | Acosta | B01D 29/15 137/590 |
| 4,431,028 | A | 2/1984 | Hendrick | |
| 4,903,725 | A * | 2/1990 | Ko | F16K 3/08 137/454.5 |
| 5,020,568 | A * | 6/1991 | Taylor | F16K 3/08 137/316 |
| 5,150,737 | A * | 9/1992 | Clerc | F16K 3/08 137/625.3 |
| 5,749,393 | A * | 5/1998 | Yang | F16K 3/08 137/454.2 |
| 5,918,626 | A | 7/1999 | Strong et al. | |
| 2008/0083898 | A1* | 4/2008 | Chen | F16K 3/08 251/208 |
| 2008/0178951 | A1* | 7/2008 | Frackowiak | F16K 3/08 137/625.41 |
| 2009/0038686 | A1* | 2/2009 | Lin | F16K 3/08 137/39 |
| 2009/0057590 | A1* | 3/2009 | Kok-Hiong | F16K 3/08 251/208 |
| 2009/0189108 | A1* | 7/2009 | Ritter | E03C 1/0403 251/304 |
| 2011/0114864 | A1* | 5/2011 | Wu | F16K 3/08 251/321 |
| 2014/0299803 | A1* | 10/2014 | Hansen | F16K 1/2285 251/92 |

FOREIGN PATENT DOCUMENTS

| | | |
|---|---|---|
| GB | 2166221 | 4/1986 |
| GB | 2340917 | 3/2000 |
| WO | 2011088782 | 7/2011 |

* cited by examiner

GATE VALVE

CROSS REFERENCE TO RELATED APPLICATIONS

The present application is the U.S. national stage application of International Application PCT/GB2014/052072, filed Jul. 8, 2014, which international application was published on Jan. 15, 2015, as International Publication WO2015/004438. The International Application claims priority of British Patent Application No. 1312348.4, filed Jul. 10, 2013, British Patent Application No. 1408647.4, filed May 15, 2014, and British Patent Application No. 1409240.7, filed May 23, 2014, the contents of which are incorporated herein by reference in their entireties.

This invention relates to a gate valve, and to parts thereof. In particular, the invention relates to a gate valve of the type in which the gate thereof carries at least one gate button, and to parts of such a valve.

BACKGROUND

British Patent Number GB2340917 describes a rotary gate valve comprising a housing that supports a valve seat and valve gate. The valve seat has an inlet port and an outlet port, and fluid communication therebetween is controlled by the valve gate. The valve gate is angularly moveable between a closed position in which it seals at least one of the inlet and outlet ports, and an open position in which fluid can communicate between the inlet and outlet ports, via the valve gate. A contacting face of the valve gate is maintained in sliding contact with the valve seat throughout the range of movement (from closed to open positions), and the contacting face of the valve gate forms a metal to metal seal with the valve seat in the closed position. In some arrangements, the valve gate includes at least one gate button, each of which comprise a circular contacting face. Each gate button has a circular cross section, and the circular contacting face is larger in diameter than the circular port of the valve seat that is sealed thereby in the closed position. The gate buttons are spring biased into engagement with, and so exert a load on, the valve seat. In the fully closed position, the circular contacting face of the gate button is concentric with the circular port that it seals.

In use, when the valve gate is moved to an opened position, the buttons no longer close the inlet and outlet ports, and fluid is able to flow between the inlet and outlet ports via flow passages provided in the valve gate and a chamber located to the opposition side of the valve gate to the inlet and outlet ports.

It will be appreciated that the initial fluid flow upon cracking open of the valve occurs through only a small cross sectional area. During this phase of the operation of the valve, the gate buttons are only supported about part of the periphery thereof. The combination of the fluid flow and the applied fluid pressures, especially where the valve is being used to control the flow of fluids under high pressure, for example in the region of 15000 psi, may tend to result in limited deflection or tilting of the buttons which, in turn, may damage a wear resistant coating applied to the valve seat, for example causing cracking thereof. Obviously, this is undesirable.

One of the objects of the present invention, therefore, is to relieve this problem.

SUMMARY

According to a first aspect of the invention, there is provided a valve gate button comprising a contacting face for sealing a port of a valve seat, wherein the contacting face is flat and has a substantially straight flow control edge. For example, it may be of truncated circular shape having a substantially flat edge. Alternatively, it may be of substantially segment shaped form. For example, it may have a leading face defining the aforementioned substantially flat edge, a trailing face defining a second substantially flat edge, and a curved peripheral face. The applicant has found that this modified shape of the contacting face significantly reduces damage of a corresponding valve seat as, whilst support for the valve seat does not extend entirely around a port thereof when the valve is opened, support is enhanced compared to the case where the contacting face is of non-truncated circular shape.

Where the face is of truncated circular shape, it may comprise a base circle truncated by a chord. The chord may have a length approximately equal to the radius of the base circle.

The valve gate button may comprise tungsten carbide.

The button may comprise a retaining portion, rearward of the contacting face for co-operating with a corresponding recess of a valve gate body to retain the button in position.

The retaining portion may be a substantially cylindrical portion that extends rearward of the contacting face.

The retaining portion may comprise guide means for maintaining the rotational orientation of the button so that the substantially flat edge of the contact face is maintained in the proper orientation. Alternatively and/or additionally, the button may be received within a correspondingly shaped pocket of the valve gate body, thereby resisting angular movement of the contacting surface relative to the valve gate body.

The retaining portion may comprise a spring recess for receiving a spring element.

According to a second aspect of the invention, there is provided a valve gate comprising at least one gate button according to a first aspect of the invention and a gate body, wherein the gate body is configured to retain the at least one button in sliding contact with a valve seat, and to move the at least one button between an open and closed position by rotation of the button holder about an axis thereof.

The gate body may comprise a button recess for receiving a portion of the button.

The gate body may comprise two button recesses that are substantially diametrically opposed about the rotation axis of the button holder.

The button recesses may be slightly offset from diametrically opposite, so that the centroid of the contacting face of each button, received in the button recesses and aligned with the truncated edge of the contacting face substantially perpendicular to the direction of rotation, more accurately aligns with the centre of a pair of diametrically opposite ports in a valve seat.

The gate body may comprise at least one flow passage for allowing communication of fluid through the button holder when the button holder is in a valve and is in the open position.

According to a third aspect of the invention, there is provided a gate valve comprising a valve seat and a valve gate, wherein the valve seat comprises at least one port, and the valve gate comprises respective buttons for each port, wherein each button is according to the first aspect of the invention, the contacting face of each button being moveable in sliding contact with the valve seat between a closed position wherein the contacting face seals its respective port, and an open position wherein fluid is allowed to communicate through the respective port.

The gate valve may comprise a valve gate according to the second aspect of the invention.

Each of the at least one port may be substantially circular. However, where the gate valve buttons are of substantially segment shaped form, the ports are conveniently of a similar shape to the buttons, but of smaller dimensions.

The gate valve may comprise a body that is securable to the valve seat to retain the valve gate adjacent thereto.

The gate valve may comprise an elongate stem that is engageable with the valve gate to rotate the valve gate.

The elongate stem may extend through the body.

The gate valve may comprise a metal to metal seal at the interface between the stem and body.

The gate valve may comprise a metal to metal seal at the interface between the body and seat.

Each surface of the valve seat with which a button is in sliding contact may comprise tungsten carbide. Each of these valve seat surfaces may have a tungsten carbide coating.

BRIEF DESCRIPTION OF THE DRAWINGS

Embodiments of the invention will further be described, by way of example, with reference to the following drawings in which.

DETAILED DESCRIPTION OF THE DRAWINGS

Figure 1:
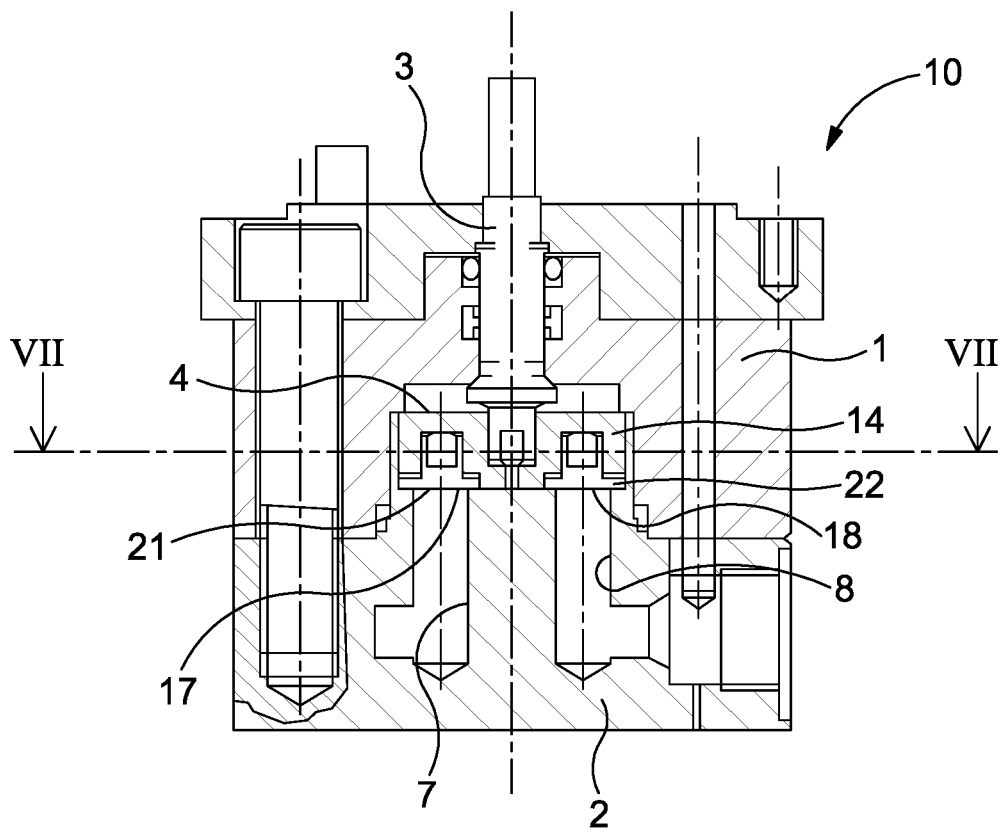
FIG. 1 is a schematic sectional view of a prior art valve, as described and illustrated in GB2340917.
Figure 2:
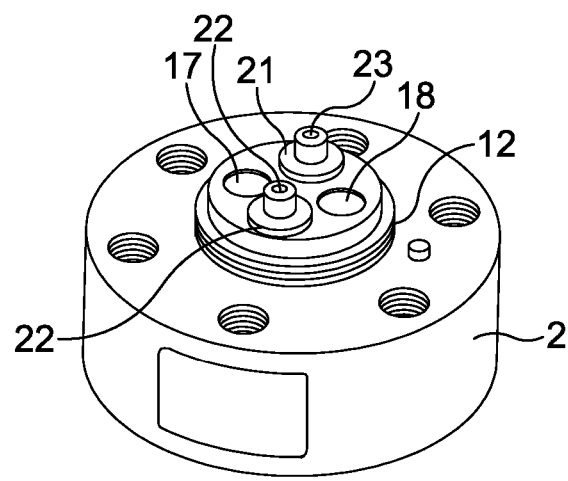
FIG. 2 is a schematic view of a prior art valve seat with two prior art buttons in the open position.
Figure 3:
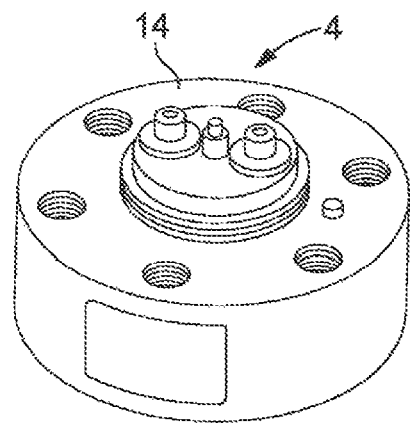
FIG. 3 is a schematic view of a prior art valve seat with a valve gate comprising two prior art buttons in the closed position.

FIG. 1 shows a prior art gate valve 10 comprising a body 1, seat 2, stem 3 and gate 4. Various parts of a similar valve in a number of positions are shown in FIGS. 2 and 3.

The valve body 1 is adapted to be secured to the valve seat 2, to retain the stem 3 and gate 4, sometimes referred to as a button carrier. The valve gate 4 is retained by the body 1 adjacent to the seat 2, and the stem 3 is retained engaged with the gate 4 so that rotation of the stem 3 results in rotation of the gate 4. An internal chamber 5 is defined by the body 1 and seat 2, above the gate 4, through which the stem 3 extends.

The valve seat 2 comprises an inlet flow passage 7 and an outlet flow passage 8. The valve seat 2 has a flat circular face with a circular inlet port 17 defining an end of the inlet flow passage 7 and a circular outlet port 18 defining the end of the outlet flow passage 8. The inlet port 17 and outlet port 18 are the same size, are disposed on the same diameter, and are diametrically opposite.

Whilst reference is made herein to the valve as having an inlet flow passage 7 and associated port 17, and an outlet flow passage 8 and associated port 18, the valve is capable of controlling fluid flow in either direction and so these references are intended to assist in understanding rather than being limiting in any way.

The valve gate 4 comprises a gate body 14, an inlet button 21 and an outlet button 22. The gate body 14 is substantially cylindrical and has first and second diametrically opposite through holes 27, 28, extending parallel to the axis of the gate body 14, that allow communication between the chamber 5 and the inlet port 17 and outlet port 18 respectively. When the gate 4 is in the fully open position, the first through hole 27 lines up with the inlet port 17 of the valve seat 2, and the second through hole 28 lines up with the outlet port 18 of the valve seat 2. A continuous flow path is thereby defined by the inlet passage 7 of the valve seat 2, the first through hole 27, the chamber 5, the second through hole 28, and finally the outlet passage 8.

The inlet button 21 and outlet button 22 are identical to one another, and comprise a circular flange at one end with a circular contacting face that is, in use, maintained in sealing contact with the flat circular face of the valve seat 2. Rearward of the flange, each button comprises a substantially cylindrical portion which is received in a corresponding recess within the valve gate body 14. The rearward cylindrical portion of each button has an internal recess for receiving a spring element 23.

The button holding recesses of the valve gate body 14 are diametrically opposite, and are offset from the through holes 27, 28 by 90 degrees. In use, a spring element 23 is disposed in the recess of each button, and the buttons are disposed in the button holding recess of the valve gate body 14. The spring elements 23 thereby provide a biasing force that maintains each button 21, 22 in engagement with the valve seat 2. When the valve gate 4 is in the closed position, the inlet button 21 is aligned with the inlet port 17 and the outlet button 22 is aligned with the outlet port 18, and both ports 17, 18 are closed by their respective buttons 21, 22.

In use, with the valve in its closed position, the fluid pressure within the inlet flow passage 7 may be sufficient to lift the inlet button 21 from the valve seat 5, allowing fluid to flow into and pressurise the chamber 5. The fluid pressure within the chamber 5 applies a load to the outlet button 22, the differential loadings on the outlet button 22 arising from the difference in pressure applied to the surfaces thereof, and the different areas against which the fluid pressure is acting being sufficient to maintain the outlet button 22 in sealing engagement with the valve seat 2, closing the outlet port 18 and so preventing fluid flow to the outlet flow passage 8.

The stiffness of the spring elements 23 may assist in maintaining the outlet button 22 in sealing engagement with the valve seat 2, but it is usually the fluid pressure imparted loads that generate the sealing effect.

This type of valve may be used to control fluids with relatively high pressures, for example 100 MPa (15 kpsi). It will be appreciated that when such high pressure are present, the forces urging the outlet button 22 into engagement with the valve seat 2 are very high.

The valve seat may comprise a tungsten carbide coating in the flat circular area thereof, and the buttons may consist of solid tungsten carbide.

The applicant has found that whilst when the valve is closed the engagement of each gate button with the valve seat provides support for the seat, allowing the seat to bear the high loadings resulting from the application of the high fluid pressures to the outlet button 22, as the valve gate is moved to a position in which the valve is just cracked open, the effect of the fluid flow through the valve and the pressure on parts of the button not supported by the seat can result in displacement, deflection or tilting of the button 22. Such movement or deformation of the button 22 can cause damage to the coating applied to the valve seat 2 as the coating is relatively stiff and cannot accommodate such flexing. Consequently, cracks will tend to form, observed as microcracking of the tungsten carbide coating.

Figure 4:
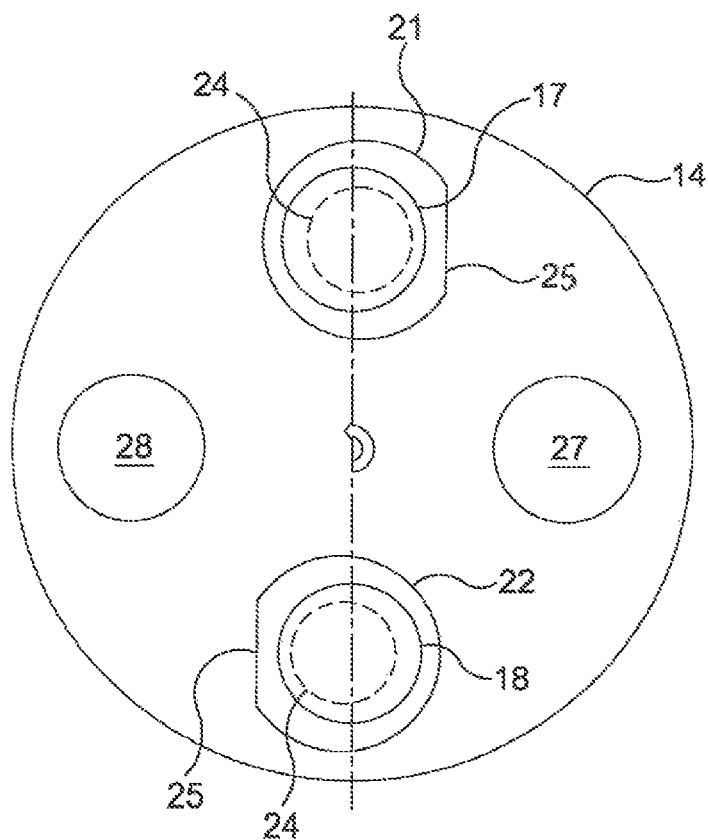
FIG. 4 is a schematic plan view of a valve according to an embodiment of the invention in the closed position.

Referring to FIG. 4, a first embodiment of the invention is shown, wherein the valve gate 4 has been modified.

The buttons 21, 22 of the modified valve gate have a contact face that includes a flat or substantially flat flow control edge. In this case, the contact face of each button is of truncated circular shape. In this embodiment, the truncated edge 25 defining the leading edge is a straight line, and is a chord of the base circle of the contact face. The length of the chord is approximately equal to the radius of the base circle of the contact face. The gate body 14 of the embodiment retains the buttons 21, 22, and has through holes 27, 28. The buttons 21, 22 are diametrically opposite each other as are each of the through holes 27, 28, and the buttons 21, 22 and through holes 27, 28 are on the same circumference. The diameter on which the buttons 21, 22 lie is at approximately 90 degrees to the diameter on which the through holes 27, 28 lie.

The gate body 14 includes guide means for maintaining the orientation of the contact face relative to the direction of movement of the valve gate 4. The guide means conveniently comprises a pocket in which the button is located, the cross-sectional shape of the pocket substantially matching that of the button such that the button is retained in the pocket and is not capable of significant angular movement relative thereto. The orientation is maintained such that the movement of the valve gate 4 during closing is normal to the truncated edge 25 of each button. The rearward cylindrical portion of each button may be modified to include a flat face (not shown), parallel to the axis of the rearward cylindrical portion 24, that co-operates with a corresponding feature of the recess in the valve gate body 14 to maintain the rotational orientation of the button in the valve gate body 14.

If the truncated circular contact face were positioned over a circular port with its base circle co-axial with the port, the truncated edge 25 would be closer to the edge of the port than the circular edge portion of the contact face. In the present embodiment, the gate body 14 is configured to retain each button 21, 22 in a position that corresponds with the ports 17, 18 of the valve seat 2 such that when the gate is in the closed position: the centre of the base circle of each contact face is on the same circumference as the ports 17, 18; and the edge of the respective port 17, 18 is equidistant (measured along this circumference) from the truncated edge 25 and the circular edge portion of the contact face. The location of the centre of the base circle of the contact face of the buttons 21, 22 therefore offset slightly in a direction normal to the truncated edge 25 so that they are not at exactly 90 degrees to the first and second through holes 27, 28.

In the arrangement illustrated the portion 24 is concentric with the base circle of the button. However, this need not always be the case, and the axis of the rearward cylindrical portion 24 could, if desired, be offset away from the truncated edge of the contacting face, so that it is not co-axial with the base circle of the contact face, and may for instance be equidistant from the truncated edge 25 and the circular edge portion of the contact face. A spring element 23 central to the rearward cylindrical portion would thus exert a load that is more central to both the respective port 17, 18 in the closed position and the centroid of the contact face.

Figure 5:
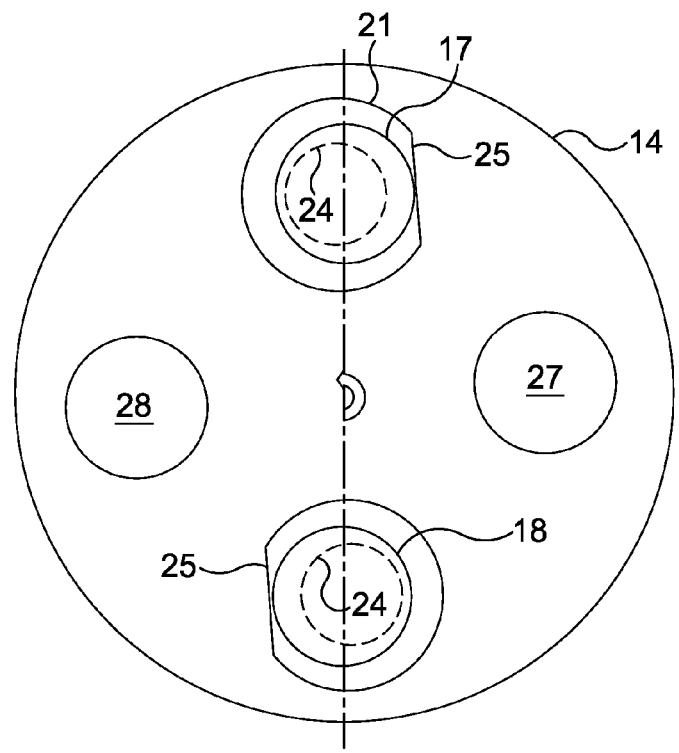
FIG. 5 is a schematic plan view of a valve according to an embodiment of the invention as it is cracking open.
Figure 6:
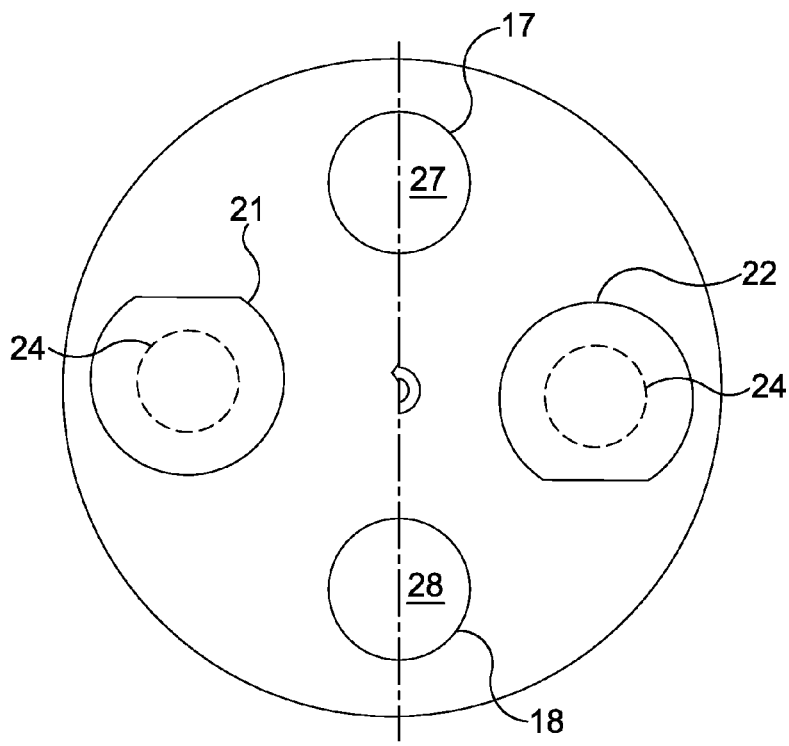
FIG. 6 is a schematic plan view of a valve according to an embodiment of the invention in the open position.

FIG. 5 shows the valve gate 4 of FIG. 4 in the cracking open position, in which the edge of the contact face of each button 21, 22 is substantially co-incident with the edge of each port 17, 18. FIG. 6 shows the valve gate of FIG. 4 in the open position, with the first and second through holes 27, 28 co-incident with ports 17, 18 respectively.

Figure 7:
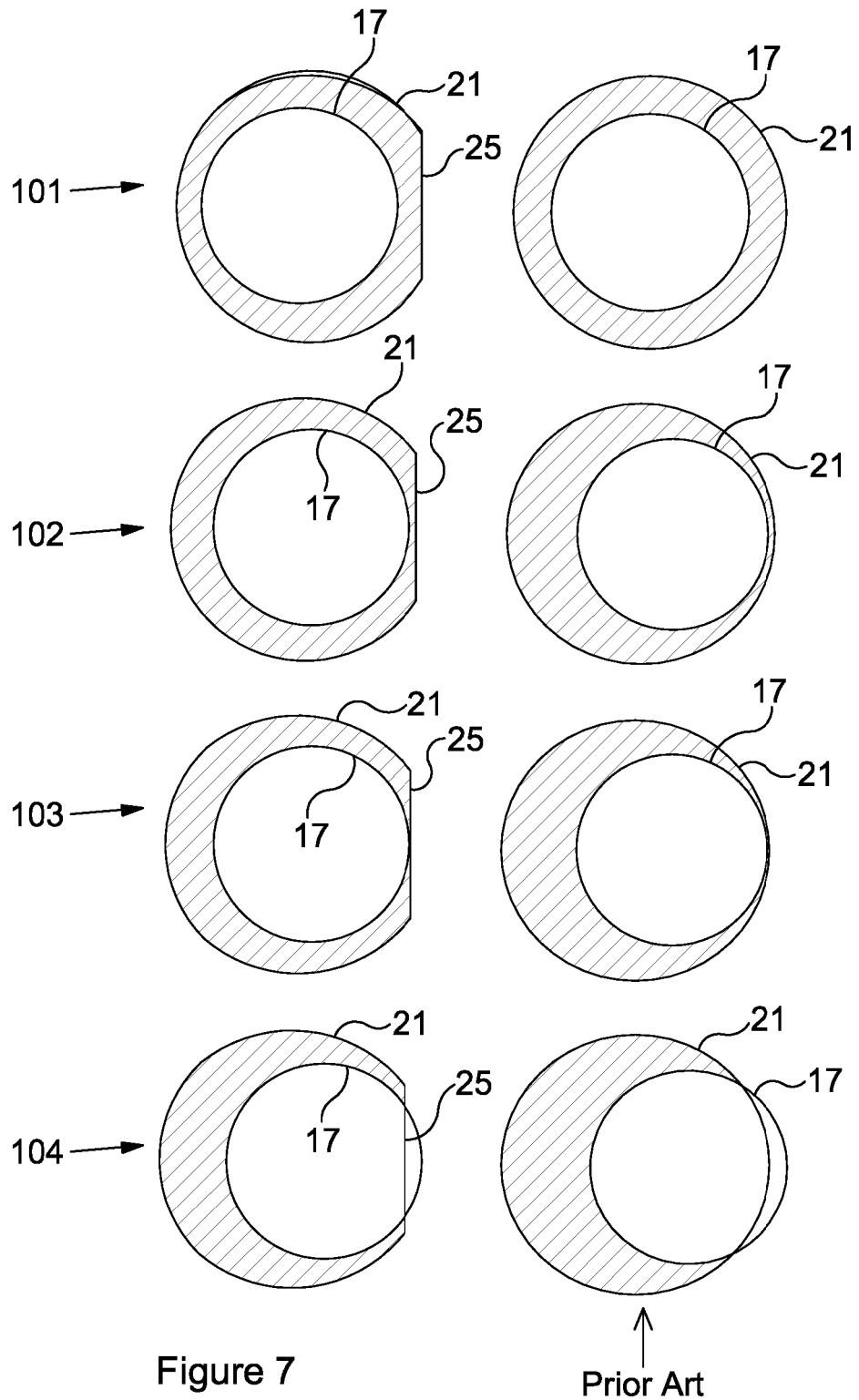
FIG. 7 is a schematic plan view of the contact area between the valve seat and a button of the prior art and a button of an embodiment of the invention, at varying button positions.

FIG. 7 illustrates why the truncated contact face according to embodiments of the present invention is advantageous, and shows, for a button according to the prior art and according to an embodiment, the contact area between the contact face and the valve seat as the valve is opened. Four stages of opening are shown, these being: 101 fully closed, 102 nearing crack open, 103 crack open, 104 slightly open.

In the fully closed position 101 both the button according to an embodiment (with a truncated circular contact face) and the button according to the prior art (with a circular contact face) have a generous contact area that supports the contact load between the button and valve seat all around the port.

As the valve is moved towards the crack open position 102, it will be appreciated that the area of the valve seat supporting the button becomes unbalanced. Once the crack open position 103 has been reached, it will be appreciated that laterally of the open part of the port, no support is provided for the button in the prior art arrangement, but the provision of the truncated edge 25 in accordance with this embodiment of the invention ensures that better lateral support for the button by the valve seat is provided. As a result, the risk of flexing or tilting of the button, and cracking or other damage to the valve seat and associated coating is reduced.

The truncated contact face of the button according to the invention thus significantly enhances the contact area supporting the part of the button closest to the port edge as the button opens the port, as is clear from FIG. 7. This reduces tilting, deflection or the like of the button and accordingly substantially prevents damage to the valve seat 2, and improves the reliability and service lifetime of a valve comprising the button.

It will be appreciated that a valve buttons 21 according to the present invention may be retro-fittable to an existing valve gate body 14, although modification of the gate body may be necessary to ensure that the buttons are held in the correct orientation. Similarly a valve gate body 14 according to the present invention may be retro-fitted to a prior art valve to improve the reliability and service life thereof.

Figure 8:
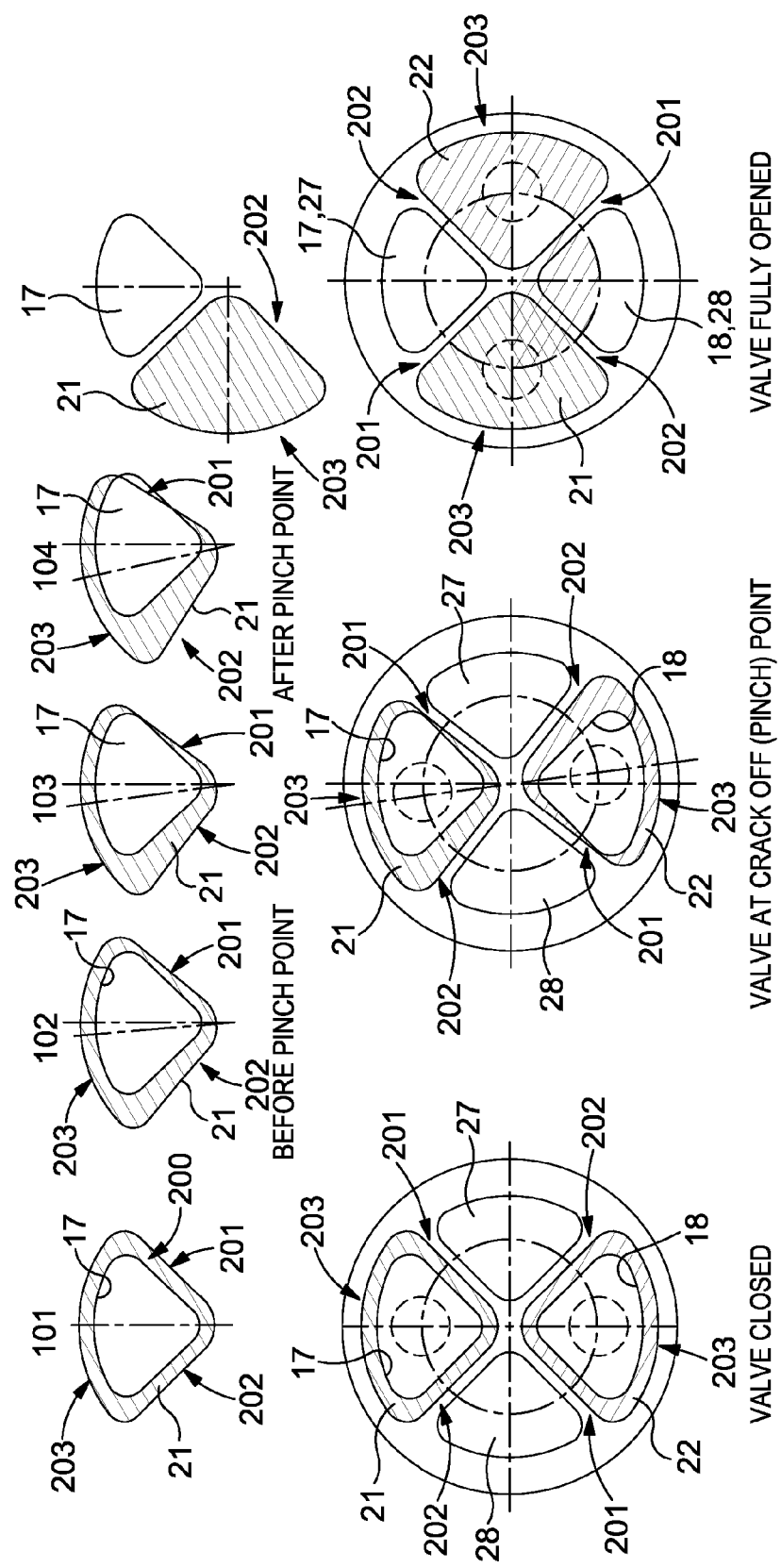
FIG. 8 is a view similar to FIG. 7 illustrating an alternative embodiment.

FIG. 8 is a view largely similar to FIG. 7, but illustrating an alternative, currently preferred embodiment. In the arrangement of FIG. 8, the valve buttons 21, 22, instead of defining a contact face of truncated circular form, instead define contact faces of substantially segment shaped form.

As shown in FIG. 8, each gate button 21, 22 defines a contact face 200 shaped to include a flow control edge 201 of substantially straight form, a trailing edge 202 also of substantially straight form and extending substantially perpendicularly to the flow control edge 201, and a curved, substantially part circular peripheral edge 203 interconnecting the flow control edge 201 and the trailing edge 202. The intersections between the edges 201, 202, 203 are all radiused.

The inlet and outlet ports 17, 18 are shaped so as to be of a similar form to the buttons 21, 22, but of smaller dimensions.

As with the arrangement of FIGS. 4 to 7, as shown in the left hand side of FIG. 8, when the valve occupies its closed position the buttons 21, 22 are supported about their entire periphery by the valve seat, a generous contact area being present between the buttons 21, 22 and the valve seat that supports the contact load between the buttons and valve seat all around the ports 17, 18.

As the valve is moved towards the crack open position 102, the area of the valve seat supporting the buttons 21, 22 becomes unbalanced or non-uniform, but still provides a good level of support. Once the crack open position 103 has been reached, as shown in the centre part of FIG. 8, it will be appreciated that part of the control edge 201 no longer engages the valve seat, and so is not directly supported. However, the contact area between the button 21, 22 and the valve seat, especially radially outward of the port 17, 18, remains generous and so a good level of support for the button 21, 22 is maintained, reducing the likelihood of deformation or tilting thereof, and so reducing the risk of damaging the valve seat.

As with the arrangement of FIGS. 4 to 7, therefore, the substantially straight flow control edge 201 of the button according to the invention significantly enhances the contact area supporting the part of the button closest to the port edge as the button opens the port. This reduces tilting, deflection or the like of the button and accordingly substantially prevents damage to the valve seat 2, and improves the reliability and service lifetime of a valve comprising the button.

Figure 9:
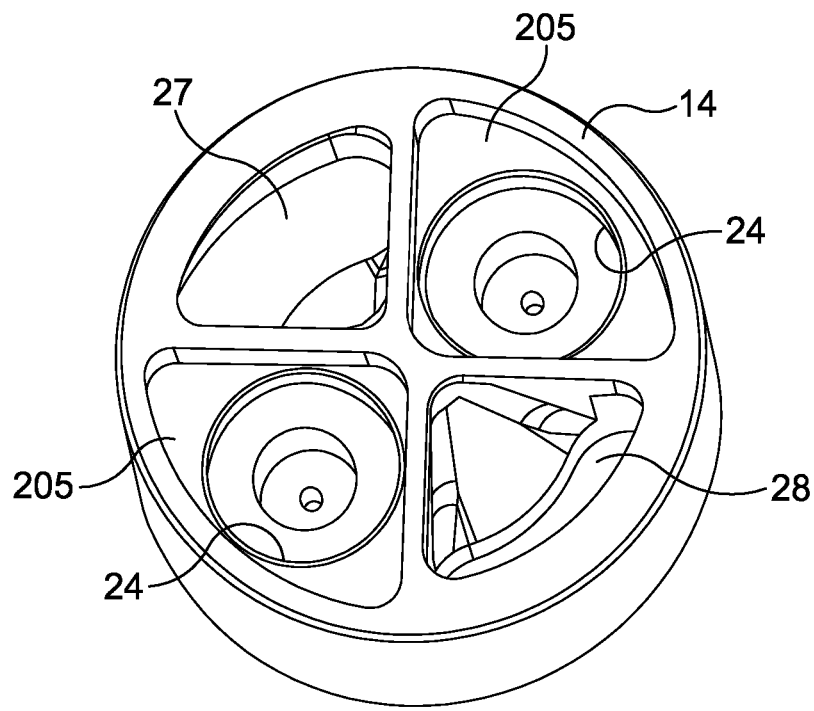
FIGS. 9 and 10 are views illustrating part of the valve of FIG. 8.
Figure 10:
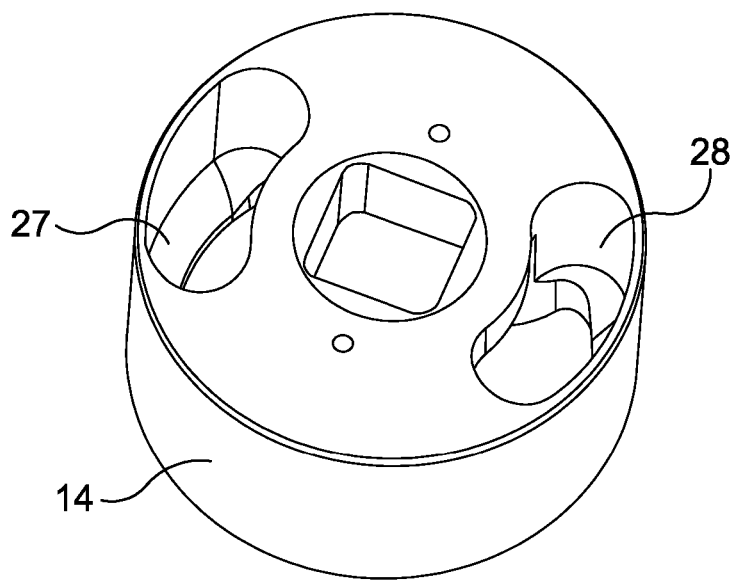

As shown in FIGS. 9 and 10, the gate body 14 is provided with pockets or recesses 205 shaped to conform with the shape of the buttons 21, 22. The buttons 21, 22, as with the arrangement of FIGS. 4 to 7, are conveniently provided with portions 24 of generally cylindrical form arranged to be received within correspondingly shaped parts of the pockets or recesses 205.

The through holes 27, 28 are conveniently shaped, at their ends closest to the valve seat, to match the shapes and sizes of the ports 17, 18 such that when the valve occupies its fully open position, the through holes 27, 28 form extensions to the passages 7, 8. However, within the gate body 14, each through hole 27, 28 is conveniently of non-uniform cross-sectional shape with the result that the end of each through hole 27, 28 which opens into the chamber 5 is of lozenge or kidney shaped form. Whilst the shapes of the through holes 27, 28 are not continuous along their lengths, the cross-sectional areas thereof are conveniently substantially uniform along the full length of each through hole.

Shaping of the through holes 27, 28 in this manner allows the changes in fluid flow direction as the fluid flows between the inlet and outlet of the valve to be less sharp, and directs such flow around the stem 3 which extends through the chamber 5. Accordingly, flow through the valve is less restricted, resulting in improved flow characteristics and therefore increased flow capability and improved CV value.

Although an embodiment has been described with both an inlet button 21 and an outlet button 22, it will be appreciated that some embodiments may comprise a single button only.

Whilst specific embodiments of the invention have been described hereinbefore, it will be appreciated that a number of modifications and alterations may be made thereto without departing from the scope of the invention.

The invention claimed is:

1. A valve gate comprising a gate body and at least two gate buttons, each gate button comprising a contacting face configured for sealing a respective port of a valve seat, wherein the contacting face of each gate button is flat, and wherein each gate button has an outer periphery with a substantially straight flow control edge in the form of a chord, the gate button comprising a circular cross section with the circular segment created by the chord removed, the gate body having an axis, the gate body being configured to retain the gate buttons in sealing contact with the valve seat and to move the gate buttons through respective arcuate paths, the gate body being movable between a closed position in which the gate buttons fully overlie the respective ports and an open position displaced from the closed position by rotation of the gate body about the axis, the valve gate further comprising a guide having pockets, the pockets being defined within the gate body and the gate buttons being located within the pockets, the pockets each having a cross-sectional shape substantially matching that of the gate buttons.

2. The valve gate according to claim 1, wherein the contacting face is of substantially segment shaped form.

3. The valve gate according to claim 1, wherein the chord has a length approximately equal to the radius of the base circle.

4. The valve gate according to claim 1, wherein each of the gate buttons comprise tungsten carbide.

5. The valve gate according to claim 1, wherein each of the gate buttons further comprise a retaining portion, rearward of the contacting face, for co-operating with a corresponding recess of a valve gate body to retain the gate buttons in position.

6. The valve gate according to claim 5, wherein the retaining portion is a substantially cylindrical portion that extends rearward of the contacting face.

7. The valve gate according to claim 5, wherein the retaining portion comprises a guide for maintaining the rotational orientation of the gate buttons about the axis of the base circle.

8. The valve gate according to claim 5, wherein the retaining portion comprises a spring recess for receiving a spring element.

9. The valve gate of claim 1, wherein the gate body comprises at least one flow passage for allowing communication of fluid through the gate body when the valve gate is in a valve and is in the open position.

10. The valve gate of claim 9, wherein the flow passage is of substantially segment shape at one end and is of lozenge shape at the other end thereof.

11. A gate valve comprising a valve seat and a valve gate, wherein the valve seat comprises at least two ports, and the valve gate comprises at least two gate buttons, each of the gate buttons corresponding with a respective one of the ports, wherein each of the gate buttons comprises a contacting face for sealing the corresponding port in use, wherein the contacting face is flat and each of the gate buttons has an outer periphery with a substantially straight flow control edge in the form of a chord, the gate button comprising a circular cross section with the circular segment created by the chord removed, wherein the gate body is configured to retain the gate buttons in sealing contact with the valve seat and to move the gate buttons through a respective arcuate path, the gate body being movable between a closed position in which the gate buttons fully overlie the corresponding ports and an open position displaced from the closed position by rotation of the gate body about an axis thereof, the valve gate further comprising a guide having pockets defined within the gate body, the gate buttons being located within respective ones of the pockets, wherein the cross-sectional shapes of the pockets substantially matches that of the gate buttons.

12. A valve gate comprising a gate body and at least two gate buttons, the gate body having an axis, each gate button comprising a contacting face configured for sealing a respective port of a valve seat, wherein the contacting face of each gate button is flat, and wherein each gate button has an outer periphery with a substantially straight flow control edge, the flow control edge straight with respect to an axis perpendicular to the axis, the gate body being configured to retain the gate buttons in sealing contact with the valve seat and to move the gate buttons through respective arcuate paths, the gate body being movable between a closed position in which the gate buttons fully overlie the respective ports and an open position displaced from the closed position by rotation of the gate body about the axis, the valve gate further comprising a guide having pockets, the pockets being defined within the gate body and the gate buttons being located within the pockets, the pockets each having a cross-sectional shape substantially matching that of the gate buttons, wherein the contacting face is shaped to define the substantially straight flow control edge, a substantially straight trailing edge, and a curved peripheral edge interconnecting the flow control edge and the trailing edge.

13. The valve gate according to claim 12, wherein the curved peripheral edge is of substantially part circular shape.

14. The valve gate according to claim 12, wherein each of the gate buttons comprise tungsten carbide.

15. The valve gate according to claim 12, wherein each of the gate buttons further comprise a retaining portion, rearward of the contacting face, for co-operating with a corresponding recess of a valve gate body to retain the gate buttons in position.

16. The valve gate according to claim 15, wherein the retaining portion is a substantially cylindrical portion that extends rearward of the contacting face.

17. The valve gate according to claim 15, wherein the retaining portion comprises a guide for maintaining the rotational orientation of the gate buttons about the axis of the base circle.

18. The valve gate according to claim 15, wherein the retaining portion comprises a spring recess for receiving a spring element.

19. The valve gate of claim 12, wherein the gate body comprises at least one flow passage for allowing communication of fluid through the gate body when the valve gate is in a valve and is in the open position.

20. The valve gate of claim 19, wherein the flow passage is of substantially segment shape at one end and is of lozenge shape at the other end thereof.

* * * * *